April 26, 1960 P. H. VAN ANROOY 2,934,722

SIGNAL-TRANSLATING NETWORKS

Filed July 18, 1956 2 Sheets-Sheet 1

PETER H. VAN ANROOY
*INVENTOR.*

BY John J. Pederson

HIS ATTORNEY

PETER H. VAN ANROOY
*INVENTOR.*

BY John J. Pederson

HIS ATTORNEY.

2,934,722

United States Patent Office

Patented Apr. 26, 1960

2,934,722

SIGNAL-TRANSLATING NETWORKS

Peter H. Van Anrooy, Itasca, Ill., assignor to Zenith Radio Corporation, a corporation of Delaware Application July 18, 1956, Serial No. 598,627

1 Claim. (Cl. 333—76)

This invention relates to signal-translating networks and in particular to an interstage coupling network applicable to intermediate-frequency amplifiers for use in color television receivers and the like.

A primary purpose of a television receiver interstage coupling network is to provide uniform response to those signals comprising the desired video information while reducing the adjacent and associated sound carriers and extraneous signals to a predetermined attenuation level.

Heretofore the gain-bandwidth requirements of intermediate-frequency circuitry associated with monochrome television receivers could be met sufficiently through utilization of conventional trap circuits in conjunction with a plurality of stages of stagger-tuned amplification. The exigencies of color television, however, impose more stringent selectivity requirements upon the intermediate-frequency portion of the receiver. The problem is apparent when it is realized that in addition to the video and synchronization signals, the available channel space, that is, 6 megacycles, must also accommodate color information intelligence. In color television receivers the proximity of the chrominance signals to the associated sound I.-F. carrier is such that conventional filter circuitry in conjunction with conventional stagger tuning is inadequate to provide a sufficiently steep attenuation characteristic without resort to an undesirably large number of tuned circuits.

It is seen, therefore, that this problem peculiar to color television receivers is twofold in nature; first, there is the requirement of greater bandwidth to accommodate the added chroma intelligence, and secondly, the necessity of securing a required degree of attenuation of the associated and adjacent sound carriers. Accordingly, the subject matter of this invention is directed to an interstage coupling network capable of satisfying the aforementioned requirements.

The Radio, Electronics, and Television Manufacturers Association has recommended to the industry that in the interest of uniformity specified frequencies be standardized for the intermediate-frequency portion of television receivers. These recommended frequencies are designated below and are utilized herein as an aid in teaching an embodiment of the invention; however, the illustrative consideration of these frequencies is not to be construed as restricting or limiting the application of the invention. In a standard color television receiver, therefore, frequencies of importance with respect to selectivity are the associated sound I.-F. carrier—41.25 megacycles, the chroma carrier—42.17 megacycles, the video carrier—45.75 megacycles, and the lower adjacent sound I.-F. carrier—47.25 megacycles.

In order to preclude the possibility of interference to the color information bearing portion of the intermediate-frequency response, it is necessary to provide adequate rejection of the associated and adjacent sound carriers and to maintain the information bearing portion at a uniform level. Inspection of a typical selectivity curve of the intermediate-frequency response of a color television receiver indicates that the frequency components comprising the chroma information are susceptible to interference from the associated sound carrier—41.25 megacycles—and its side bands. Since the lower limit of the color signal spectrum extends to 41.65 megacycles, it is apparent that only a narrow band of 400 kilocycles separates these frequencies. The status of the present art is such that an attenuation in the order of 30 decibels (db) is generally considered to be sufficient rejection of the associated sound carrier, and the attainment of this amount of attenuation in itself presents no problem, but as hereinbefore noted a very real and very difficult problem exists when it is required to provide substantial attenuation (approximately 30 db in this particular application) between two high-frequency signals separated by a mere 400 kilocycles which represents a very small fraction of the carrier frequency (less than 1.0%). It is to be considered also that attenuation of the 41.25-megacycle carrier by an amount substantially in excess of 30 db is undesirable in view of the fact that this associated sound carrier must be subsequently recovered from the composite video signal and utilized in the sound channel.

The adjacent sound carrier does not present such a formidable problem. Its required displacement (attenuation) from the nominally flat portion of the I.-F. response characteristic is essentially the same as required in monochrome television receiver applications. However the higher obtainable attenuation (as much as 100 db or more) available through use of the subject invention works a distinct advantage in improving the fidelity of the receiver.

The problem therefore is to obtain an intermediate-frequency response characteristic having a sufficiently steep attenuation slope between the associated sound carrier and the lower frequency limit of the chroma band and to do so without a multiplicity of amplification stages and/or tuned circuits. Previous methods of dealing with this problem have been directed to utilization of one or more traps comprised of parallel- or series-tuned circuits, such circuits (traps) being tuned to the particular sound carrier it is desired to reject. A limiting factor, however, in any trap is the inherent resistance of the electrical components employed; this resistance tends to lower the Q of the tuned circuit, thereby reducing the sharpness or selectivity of the circuit response.

It is therefore an object of this invention to provide a signal-translating network having an exceptionally steep amplitude transition characteristic between narrowly separated frequencies.

It is another object of this invention to provide a signal-translating network having a superior response characteristic for color television intermediate frequency circuitry.

It is a further object to achieve these desirable objectives with a minimum expenditure of cost and components.

A coupling circuit constructed in accordance with the invention comprises a tuned transmission line having first and second conductors each of which is provided with a terminal on each end of the line. The circuit includes a first network comprising the series combination of the first conductor, a source developing signals within a predetermined frequency range and an impedance element, arranged with the first conductor disposed intermediate the signal source and the impedance element so that the source is coupled to a designated one of the terminals of the first conductor. The coupling circuit further includes a second network comprising the series combination of the second conductor, an impedance device and the input circuit of a load device arranged with the second conductor disposed intermediate the impedance device and the input circuit of the load device while the impedance device is coupled to that terminal of the second conductor which is at the same end of the transmission line as the designated one terminal of the first conductor. Means are provided for coupling a point between the impedance device and the input circuit of the load device in the second network to a point between the signal source and the impedance element in the first network. The impedance device presents an impedance of a value, selected relative to that of the impedance element, which minimizes signal current flow in the input circuit at a selected frequency within the predetermined frequency range.

The features of the present invention which are believed to be novel are set forth with particularity in the appended claim. The organization and manner of operation of the invention, together with further objects and advantages thereof, may best be understood by reference to the following description taken in connection with the accompanying drawings, in the several figures of which like reference numerals identify like elements, and in which:

Figure 1:
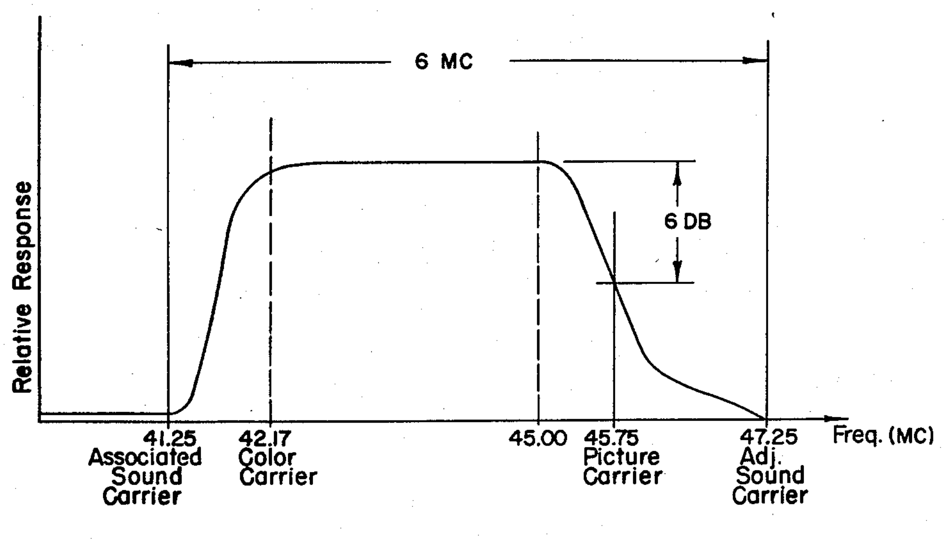
Figure 1 is a graphical illustration of the intermediate-frequency response characteristic of a color television receiver adhering to RETMA recommendation.

Figure 1 presents a typical intermediate-frequency response characteristic for a color television receiver. Frequencies of interest are designated in order to emphasize the problem that exists due to the fact that reception of color information is allocated the same spectrum width as that permitted monochrome signals. The 6-megacycle bandwidth, in addition to carrying the picture and sound carrier associated with monochrome, must in the case of color reception translate the chroma carrier and its attendant signal components.

Figure 2:
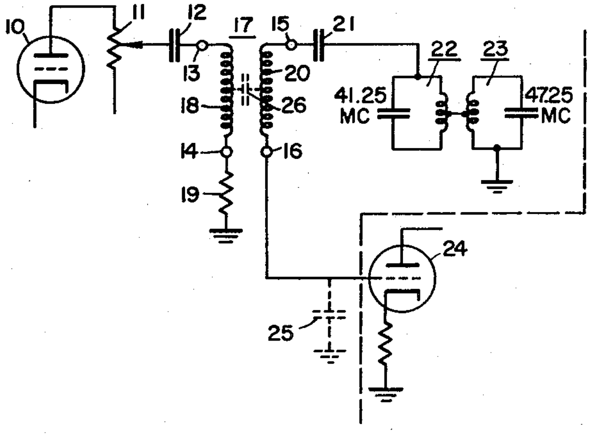
Figure 2 is a schematic diagram of a portion of the intermediate-frequency section of a color television receiver including a coupling network embodying the invention.

An interstage coupling network which comprises the subject matter of this invention is illustrated in Figure 2. In this figure, a source of modulated-carrier color video signal, such as the first I.-F. amplifier stage comprising an electron-discharge device 10 and an anode load impedance 11, is coupled through a D.C. blocking capacitor 12 to the input terminal 13 of a four-terminal network 13, 14, 15, 16. This network is preferably formed as a convoluted or bifilar-wound tuned transmission line 17 comprising a first conductor 18 terminated in a resistive (equalizing) impedance 19 through terminal 14; terminal 15 of a second conductor 20 is coupled through a blocking capacitor 21 and a pair of series-connected trap circuits 22, 23, tuned to 41.25 megacycles and 47.25 megacycles respectively, to a plane of reference potential such as ground. The terminal 16 of conductor 20 is employed as the output terminal of the network and is coupled to a second electron-discharge device 24 which may constitute the amplifying element of a second stage (not shown) of I.-F. gain, the input impedance of device 24 being designated as a capacity 25. The distributor capacity existing at any point between conductors 18 and 20 of transmission line 17 can be represented as a capacity 26.

Figure 3:
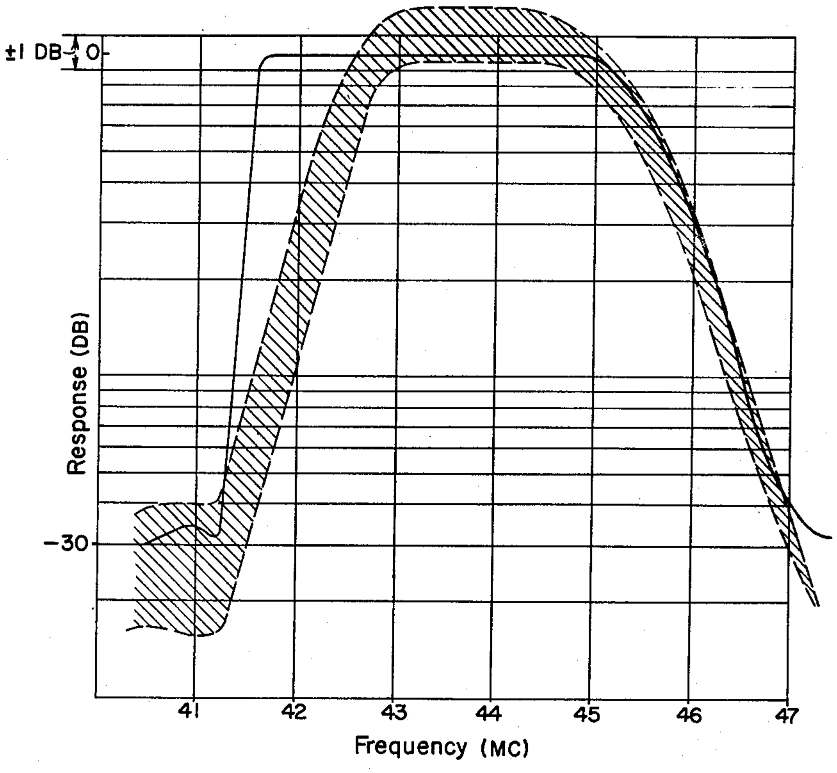
Figure 3 illustrates a graphical comparison of monochrome and color television intermediate-frequency response requirements.

Figure 3 provides a graphical comparison between the requirements of monochrome and color television intermediate-frequency response. A response characteristic lying within the shaded portion bounded by the broken-line curves would be generally acceptable in monochrome applications. However, an I.-F. response characteristic acceptable for color reception must of necessity correspond in general to the solid line curve. In essence then, Figure 3 serves to emphasize the attenuation problem existing in the vicinity of the associated sound carrier, 41.25 megacycles.

Figure 4:
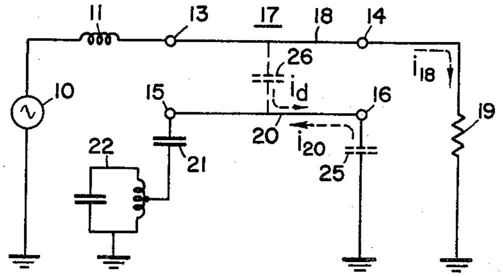
Figure 4 is a schematic transmission-line equivalent circuit of the coupling network of Figure 2.

Figure 4 shows the interstage-coupling network of Figure 2 in transmission-line equivalent circuit form. In this figure, transmission line 17 is represented as a four-terminal network and the schematic arrangement is somewhat altered as respects Figure 2 to better illustrate the various current loops. It is significant that trap 22 alone appears in Figure 4. This is intended since the development herein is relegated to those frequencies in the vicinity of the associated sound carrier; furthermore, owing to the principle of superposition, omission of traps 23 from this dissertation detracts in no way from the rigor of the analysis. A corresponding analysis may be employed to determine the specific effect of trap 23.

It can be shown mathematically that tuned transmission line 17, terminated by an impedance represented by capacitor 25 and by a pair of tuned circuits 22, 23, operates in conjunction with equalizing resistive impedance 19 to create a bridge coupling network between a low-impedance signal source, such as represented by the anode circuit of electron-discharge device 10, and the high-impedance input circuit of electron-discharge device 24. The overall effect of the coupling network of the present invention is analogous to that of a passband impedance transformer. Because of capacity coupling, represented by capacitor 26, and the inherent mutual inductive coupling between the conductors of a transmission line, the video signal is provided with two different coupling paths, i.e., one through inductive coupling and a second path through the aforementioned capacity coupling.

The problem, as already stated, is to effectively attenuate the associated sound carrier and its side bands to preclude interference within the chroma spectrum. The solution then necessitates an extremely sharp amplitude transition between the associated sound carrier and the lower limit of the chroma intelligence. A theory explaining the manner in which this transition is obtained can be predicated on the concept of a displacement current between conductors 18 and 20 of transmission line 17.

A rigorous mathematical analysis directed to the transmission line equivalent of the subject invention shows that under certain conditions a zero signal condition exists at terminal 16, which of course results in zero signal output from electron-discharge device 24.

Viewing the transmission line 17 of Figure 4 as a four-terminal network, it is apparent that impedance 19, and capacitors 25 and 26 in conjunction with a portion of transmission line 17 form a current loop. The current flowing in this loop is subject to the impedance characteristic of impedance 19. It should be apparent therefore that a voltage existing between terminal 16 and the plane of reference potential is comprised of the product of the summation of currents through capacitor 25 and the impedance of capacitor 25. Accordingly, should either the current factor or the impedance become zero, the voltage at terminal 16 becomes zero. Discarding consideration of a zero impedance since this would define a short circuit between terminal 16 and the point of reference potential, the other possibility requires that the current through conductor 20 flowing from terminal 16 be equal in magnitude and opposite in phase to a (displacement) current flowing from conductor 18 to conductor 20 toward terminal 16.

Referring to Figure 4 it is obvious that the aforementioned zero signal requirement necessitates a zero resultant current at terminal 16 (the input to electron-discharge device 24). By way of example, therefore, if an any particular instant a current in conductor 18, $i_{18}$, is flowing from terminal 13 toward terminal 14 and simultaneously a current, $i_{20}$, in conductor 20 is flowing from terminal 16 toward terminal 15, compliance with the above-mentioned postulate necessitates a displacement current, $i_d$ flowing from conductor 18 to conductor 20 and through capacitor 26 of such magnitude and direction as to cancel the pre-existing current in conductor 20 thereby producing a zero voltage at terminal 16.

Other possibilities of current flow can be conjectured which likewise are amenable to the preceding explanation but as will be shown hereinafter the essence of the subject invention is the configuration and composition of an interstage coupling network which can produce this zero resultant current at predetermined frequencies so as to produce the desired steep amplitude transition characteristic.

Viewing the parameters illustrated in the schematic for Figure 4, it is known that a particular length of transmission line 17 having inherent inductance and capacitance and characteristic impedance properties assumes the status of a fixed parameter upon determination of the particular length. Consideration of trap 22 reveals an adjustable parameter; however, trap 22 is pretuned to provide rejection of the associated sound carrier and accordingly, it can be considered a semi-fixed parameter. The magnitude of capacitor 25 of course is determined by the particular electron-discharge device 24. Attention is thus directed to terminating impedance 19 as the variable parameter suitable to effect the current cancellation to produce zero voltage at terminal 16.

In a general mathematical treatise of the subject coupling network, impedance 19 can be defined by a complex expression. However, an analysis of the expression reveals that when a proper choice of its included variables is made, the expression will at a particular frequency reduce to a pure resistance. Since this expression is a function of frequency, any wave signal deviating from that frequency, for which the parameters are preselected, will unbalance the aforementioned current cancellation thus obviating the zero voltage condition at terminal 16.

Although a resistance utilized for equalizing impedance 19 represents a feasible solution, the objectives of the invention can also be achieved if equalizing impedance 19 is permitted to assume a complex nature. Thus impedance 19 can be an inductance, capacitance, or a combination thereof that will produce an equalizing impedance at a preselected frequency that accomplishes the zero signal condition at terminal 16. Accordingly, an equalizing impedance 19 in conjunction with transmission line 17, trap circuit 22, and capacitance 25 operates to produce the desired steep attenuation transition characteristic depicted in Figure 3.

The preceding analysis therefore reveals that the frequency at which the zero signal condition is achieved can be controlled by varying either equalizing impedance 19 or the impedance of trap circuit or impedance device 22 when the inductance and the distributed capacity of the tuned transmission line 17 are either fixed or are not subject to adjustment.

Furthermore, it should be apparent that when another tuned circuit, as exemplified by trap 23 in the embodiment of Figure 2, is inserted, the phenomena explained above, i.e., zero output signal at terminal 16, can occur at a second frequency likewise determined by the parameters of the trap circuit (23) and equalizing impedance 19.

Since the resonant frequency of the tuned transmission line 17 can be readily varied, e.g., by changing its physical length, it is apparent that this feature in conjunction with variables comprising tuned circuitry constituting impedance devices (traps 22, 23), and equalizing impedance 19 constitutes an extremely flexible coupling network (not necessarily restricted to color television circuitry) with near vertical amplitude transition characteristics. Moreover, this desirable result is brought about efficiently and with an economy of price and construction.

While a particular embodiment of the invention has been shown and described, it is apparent that modifications and alterations may be made, and it is intended in the appended claim to cover all such modifications and alterations as may fall within the true spirit and scope of the invention.

I claim:

A coupling circuit comprising: a tuned transmission line having first and second conductors, each of said conductors having a terminal on each end of said line; a first network comprising the series combination of said first conductor, a source developing signals within a predetermined frequency range, and an impedance element, said first conductor being disposed intermediate said source and said impedance with said source coupled to one of the terminals of said first conductor; a second network comprising the series combination of said second conductor disposed intermediate an impedance device and the input circuit of a load device with said impedance device coupled to that terminal of said second conductor at the same end of said transmission line as said one terminal of said first conductor together with means coupling a point in said second network between said impedance device and said input circuit to a point in said first network between said signal source and said impedance element, said impedance device presenting an impedance of a value selected relative to that of said impedance element to minimize signal current flow in said input circuit at a selected frequency within said predetermined frequency range.

References Cited in the file of this patent

UNITED STATES PATENTS

| | | |
|---|---|---|
| 1,438,828 | Houck | Dec. 12, 1922 |
| 1,844,501 | Davis | Feb. 9, 1932 |
| 2,164,745 | Kenther | July 4, 1939 |
| 2,270,539 | Molling | Jan. 20, 1942 |
| 2,654,836 | Beck | Oct. 6, 1953 |
| 2,679,632 | Bellows | May 25, 1954 |
| 2,762,987 | Mackey | Sept. 11, 1956 |

OTHER REFERENCES

Avins: IRE Transactions on Broadcast and Television Receivers, vol. 1952–1955, No. PGBTR–7, July 1954, pages 14–25.

Rider: Rider Television Manual, vol. 17, published Feb. 9, 1956, page 11.